US012602636B1

(12) United States Patent
Rout et al.

(10) Patent No.: US 12,602,636 B1
(45) Date of Patent: Apr. 14, 2026

(54) CLIENT ONBOARDING ASSEMBLY LINE

(71) Applicant: Morgan Stanley Services Group Inc.,
New York, NY (US)

(72) Inventors: Sanjay Kumar Rout, Edison, NJ (US);
Zixuan Yang, New York, NY (US);
Raj Kumar, North Brunswick, NJ (US)

(73) Assignee: Morgan Stanley Services Group Inc.,
New York, NY (US)

( * ) Notice: Subject to any disclaimer, the term of this patent is extended or adjusted under 35 U.S.C. 154(b) by 301 days.

(21) Appl. No.: 17/929,469

(22) Filed: Sep. 2, 2022

(51) Int. Cl.
*G06Q 10/0631* (2023.01)
*G06F 3/0482* (2013.01)

(52) U.S. Cl.
CPC ..... *G06Q 10/06315* (2013.01); *G06F 3/0482* (2013.01)

(58) Field of Classification Search
USPC ......................................................... 705/7.25
See application file for complete search history.

(56) References Cited

U.S. PATENT DOCUMENTS

| | | | |
|---|---|---|---|
| 7,925,577 | B2 | 4/2011 | Crosthwaite et al. |
| 8,073,755 | B2 | 12/2011 | Rose et al. |
| 8,468,090 | B2 | 6/2013 | Lesandro et al. |
| 8,548,886 | B1 | 10/2013 | Bosch et al. |
| 8,732,072 | B2 | 5/2014 | Warren et al. |
| 9,275,360 | B2 | 3/2016 | He et al. |
| 10,789,641 | B2 | 9/2020 | Roselli et al. |
| 11,003,999 | B1 * | 5/2021 | Gil ......................... G06Q 40/03 |

| | | | |
|---|---|---|---|
| 2005/0246250 | A1 * | 11/2005 | Murray ................... G06Q 30/04 |
| | | | 705/30 |
| 2008/0301023 | A1 | 12/2008 | Patel et al. |
| 2011/0208603 | A1 | 8/2011 | Benefield et al. |
| 2012/0023593 | A1 * | 1/2012 | Puder ..................... H04L 63/101 |
| | | | 726/28 |
| 2012/0054642 | A1 * | 3/2012 | Balsiger ................. G06Q 10/10 |
| | | | 715/752 |
| 2013/0018651 | A1 * | 1/2013 | Djordjevic ............. G06Q 10/00 |
| | | | 704/9 |
| 2014/0258126 | A1 | 9/2014 | Johns et al. |

(Continued)

FOREIGN PATENT DOCUMENTS

WO   WO-2020107111 A1 *   6/2020   ............. G06Q 40/03

OTHER PUBLICATIONS

Philipps, Jan, and Bernhard Rumpe. "Refinement of pipe-and-filter architectures." International Symposium on Formal Methods. Berlin, Heidelberg: Springer Berlin Heidelberg, 1999. (Year: 1999).*

(Continued)

*Primary Examiner* — Kristin E Gavin
(74) *Attorney, Agent, or Firm* — K&L Gates LLP

(57) ABSTRACT

Automated and dynamic client and product/account onboarding assembly line for a firm dynamically configures a product/account type in any business line from any user/application channel of the firm. The client and product/account onboarding assembly line comprises changeable framework that dynamically configures each step according to the particular requirements of the product/account of the client. The assembly line can comprise two dynamic stages that together build any product/account type and test beds that automatically detect and discard any incorrectly assembled outputs.

12 Claims, 8 Drawing Sheets

(56) References Cited

U.S. PATENT DOCUMENTS

| 2015/0348182 A1* | 12/2015 | Cismas | G06Q 40/02 |
| | | | 705/35 |
| 2015/0379469 A1* | 12/2015 | Gordon | G06Q 10/10 |
| | | | 705/342 |
| 2017/0024091 A1* | 1/2017 | Hosier, Jr. | G06F 3/04883 |
| 2017/0147941 A1* | 5/2017 | Bauer | G06N 20/10 |
| 2017/0163587 A1* | 6/2017 | Johnson | G06Q 10/06316 |
| 2019/0057087 A1* | 2/2019 | Dandamudi | G06F 16/93 |
| 2019/0361697 A1 | 11/2019 | Hu et al. | |
| 2021/0065576 A1 | 3/2021 | Lillie et al. | |
| 2021/0256134 A1* | 8/2021 | Yun | G06F 21/6218 |
| 2021/0279795 A1 | 9/2021 | Bloy et al. | |
| 2022/0012241 A1* | 1/2022 | Colcord | G06F 9/544 |
| 2022/0028001 A1* | 1/2022 | Wachell | G06Q 10/0637 |
| 2022/0057999 A1 | 2/2022 | Pitchai Muthu et al. | |
| 2022/0138337 A1* | 5/2022 | Wilhelm | G06Q 30/0185 |
| | | | 726/1 |
| 2023/0134651 A1* | 5/2023 | Agbamu | G06Q 50/265 |
| | | | 705/325 |

OTHER PUBLICATIONS

Fagbore, Olasunbo Olajumoke, et al. "Optimizing Client Onboarding Efficiency Using Document Automation and Data-Driven Risk Profiling Models." (2022). (Year: 2022).*

\* cited by examiner

300

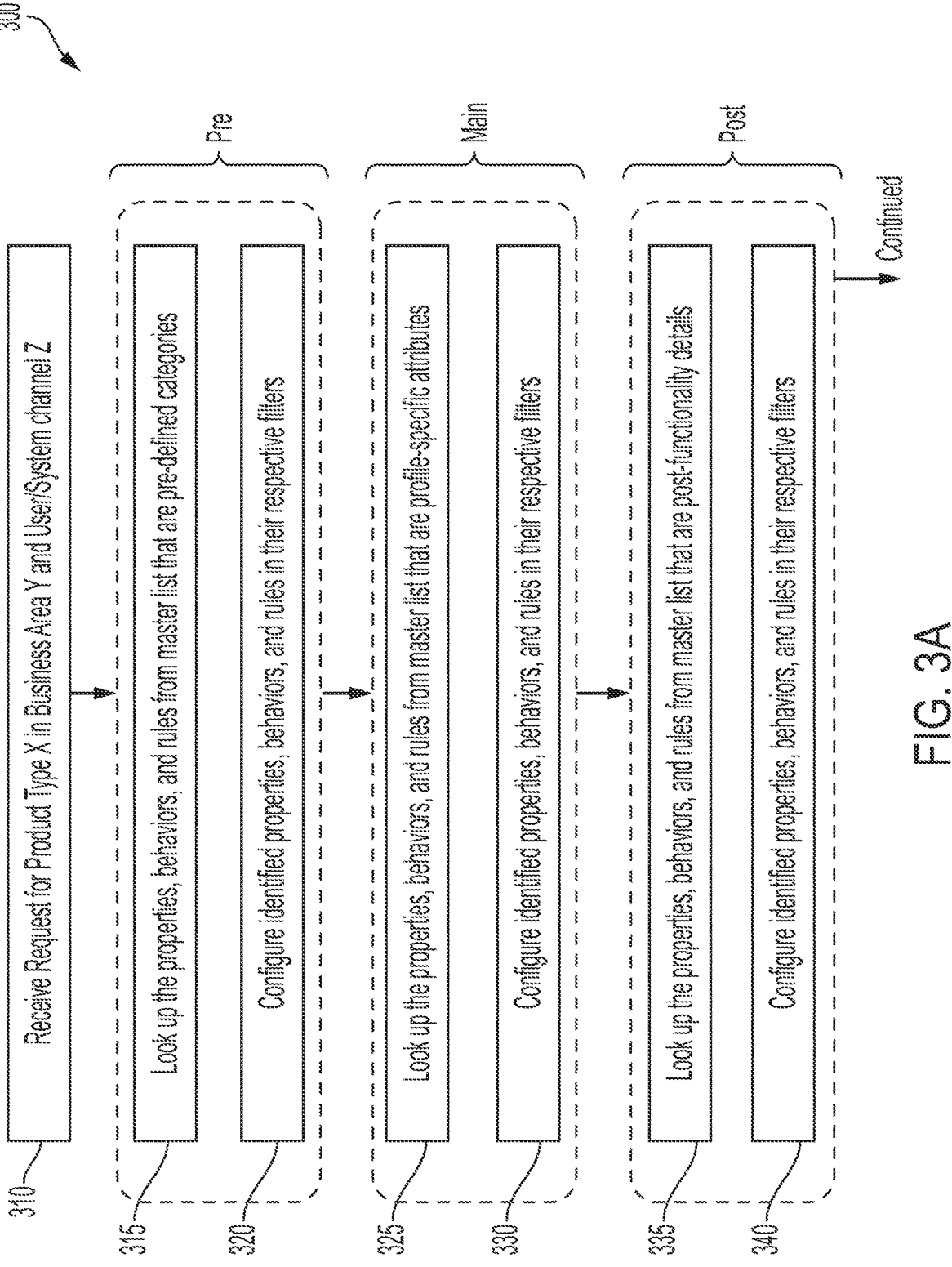

310 — Receive Request for Product Type X in Business Area Y and User/System channel Z Pre 315 — Look up the properties, behaviors, and rules from master list that are pre-defined categories 320 — Configure identified properties, behaviors, and rules in their respective filters Main 325 — Look up the properties, behaviors, and rules from master list that are profile-specific attributes 330 — Configure identified properties, behaviors, and rules in their respective filters Post 335 — Look up the properties, behaviors, and rules from master list that are post-functionality details 340 — Configure identified properties, behaviors, and rules in their respective filters Continued

FIG. 3A

CLIENT ONBOARDING ASSEMBLY LINE

FIELD OF INVENTION

The present technology pertains to systems and methods for an automated and dynamically configurable software product for onboarding processes for clients and associated products.

BACKGROUND

In most application based systems, whenever a new product or client order for a new product or suite of products is made, a new program, or software application needs to be individually created to the customer's specifications, which generally requires a heavy investment of personnel, software engineers, time and resources for writing code, debugging, and quality assurance, and then time and personnel to carry out client and product onboarding processes to finalize and deliver the product in its complete form to the client and integrate it with the client's business needs or internal processes. Furthermore, updates or changes that are pushed out to different clients, each with different applications or individualized products, must be tailored specifically to each client and to the product as well as any systems they are running, and the applications or other services they integrate into. This means that even after onboarding and deployment, large investments of time and resources are necessary, much of it for software integration and planning. Therefore, currently, products and tied-in services cannot be delivered at an efficient manner, and necessitate rewriting and continuous design and redesign of code and surrounding processes to produce similar results each tailored based on each individual client's circumstances, systems, and the current suite or application products they are using.

The creation of various products for customers, many of which are based on different features, properties and/or processes, that may be structurally linked, integrated, or associated with or third-party services and systems result in an infinite number of possibilities and additional complexities that must be dealt with by programming teams when they produce client tailored software products, this makes it very difficult or impossible to scale or replicate products, or suites of products across a range of clients, without uniformity in the system or build models for the creation of products.

In the wealth management industry, these problems arise in support of multiple investment account types in a single system, which is referred as different products. It is time-consuming and computationally inefficient for current wealth management or other types of products systems to set up different wealth products/accounts or containers of products/accounts for clients designed specifically or customized for each client without facing the myriad of problems discussed. Financial institutions generally rely on multiple systems that have multiple and complex integration schemes, where each system delivers a different type of product/account and/or services to clients. The various systems and services that are based on different underlying technologies and software languages all need to call various functions, processes and services separately in each step of running products/accounts or creating new products/accounts for clients. This is especially problematic when a client requires a wealth management product/account to be created for them that may include different or customized features to other previous products/accounts or applications. Without uniform or unified frameworks, or orchestration layers to define and manage all the product/account assembly processes, resource intensive programming and integration is usually necessary. Furthermore, these current methods are error-prone due to the risks of incorrect system implementations, integration to different programs and operating systems, and continuous process failures. Product/product type referred in the document is a generic term that supports any business across the industries, whereas account/account type referred in the document is a product/product type used in the wealth management business in the financial industry.

Current methods to support heterogeneous products/account types are also expensive and costly especially when changes need to be made to them so that they may meet business process and regulatory requirements, which is because changes might be required in multiple systems and processes across a variety of different product/account types. Where a regulatory change is required that necessitates changes being made to product/account types, then changes must be made to each of the product/account types or suites of products/accounts individually, since there is no unifying system. Generally, lines of code would have to be added to each product/account type to comply with regulatory or legal changes, and then pushed out individually to each client system, then depending on the system with its own integrations and operating systems, further debugging or coding may have to occur after the initial changes have been pushed out.

SUMMARY

In one general aspect, the present invention is directed to an automated and dynamic client and product/account onboarding assembly line for a firm that dynamically configures a product/account type, such as an investment account for a client of a wealth management firm, in any business line from any user/application channel of the firm, such as wealth management firm. Unlike a traditional assembly line that operates with a pre-defined sequence, the computer systems of the present invention can consist of changeable framework that dynamically configures each step according to the particular requirements of the product/account of the client. The assembly line can comprise two dynamic stages that together build any product/account type and test beds that automatically detect and discard any incorrectly assembled outputs.

In stage 1, the structure of the product/account is dynamically assembled based on product/account type, line of business, and user/application channel. For example, a principal list of all potential properties and associated behaviors and rules is defined for each product/account type. As a product request comes from a particular user/system channel for a particular line of business, the assembly line can dynamically tailor its assembly steps to this particular situation. For example, the first stage of the assembly line can dynamically determine and apply a subset of properties, behaviors, and rules from a principal list to configure the product/account structure for the product/account of a client in accordance with the requirements of this particular business area and system channel.

In stage 2, the onboarding processes and services of the product/account are dynamically performed based on product/account type, line of business, and system/user channel. As used herein, an "onboarding process" (or service) refers to a process (or service) that needs to be performed for a new or existing client and product/account to be onboarded for the firm. From a principal list of all onboarding processes and services, the assembly line dynamically determines the variant of onboarding processes and services and orders their desired behaviors to produce the final product/account for this particular business area and system channel.

The assembly line can leverage pipe-and-filter pattern as data pipelines to move the product/account from a filter to another filter in the data pipeline until it reaches the end of the process. Each filter essentially acts as a subassembly line and encapsulates the options and functions to dynamically configure a product/account property or an onboarding process/service for the product/account. The behaviors and rules of each product/account property and each onboarding process/service are first configured separately in their own filter, and then the configured properties and onboarding processes/services are combined together to build the final outputs. By dynamically reconfiguring and rearranging the filters, multiple configurations can be developed to build for various product/account types, line of business, and system/ user channels.

Artificial intelligence and machine learning capabilities can be integrated with the assembly line to continuously learn the patterns for various product/account assembly. The learned knowledge can be used to identify abnormal behaviors in the components of the assembly line and prevent production failures. Faults in any process orchestration can be identified automatically and corrected before the data is used in different lines of business.

Embodiments of the present invention can alleviate or solve the previously described problems in the prior art. Embodiments of the present invention can streamline and connect the processes of several separate systems into one unified framework and reduce the time to configure any types of wealth products/accounts. It also provides repeatable, standardized, and structured products and client services in higher quality. It can also increase flexibility of the systems to adapt to changes in product/account types, processes and rules and increases the efficiency of service delivery. These and other potential benefits will be apparent from the description that follows.

FIGURES

Various embodiments of the present invention are described herein by way of example in connection with the following figures.

FIGS. 1A and 1B present a first stage of an exemplary embodiment of a product/account assembly process.

FIG. 2 presents a second stage of an exemplary embodiment of a product/account assembly process.

FIGS. 3A-3B presents one embodiment of a two-stage Pre-Main-Post framework process to assemble a product/ account type or product container.

FIG. 4 presents one embodiment of the Pre-Main-Post framework architecture that may be utilized by the assembly processes according to various embodiments.

DESCRIPTION

Figure 1A:
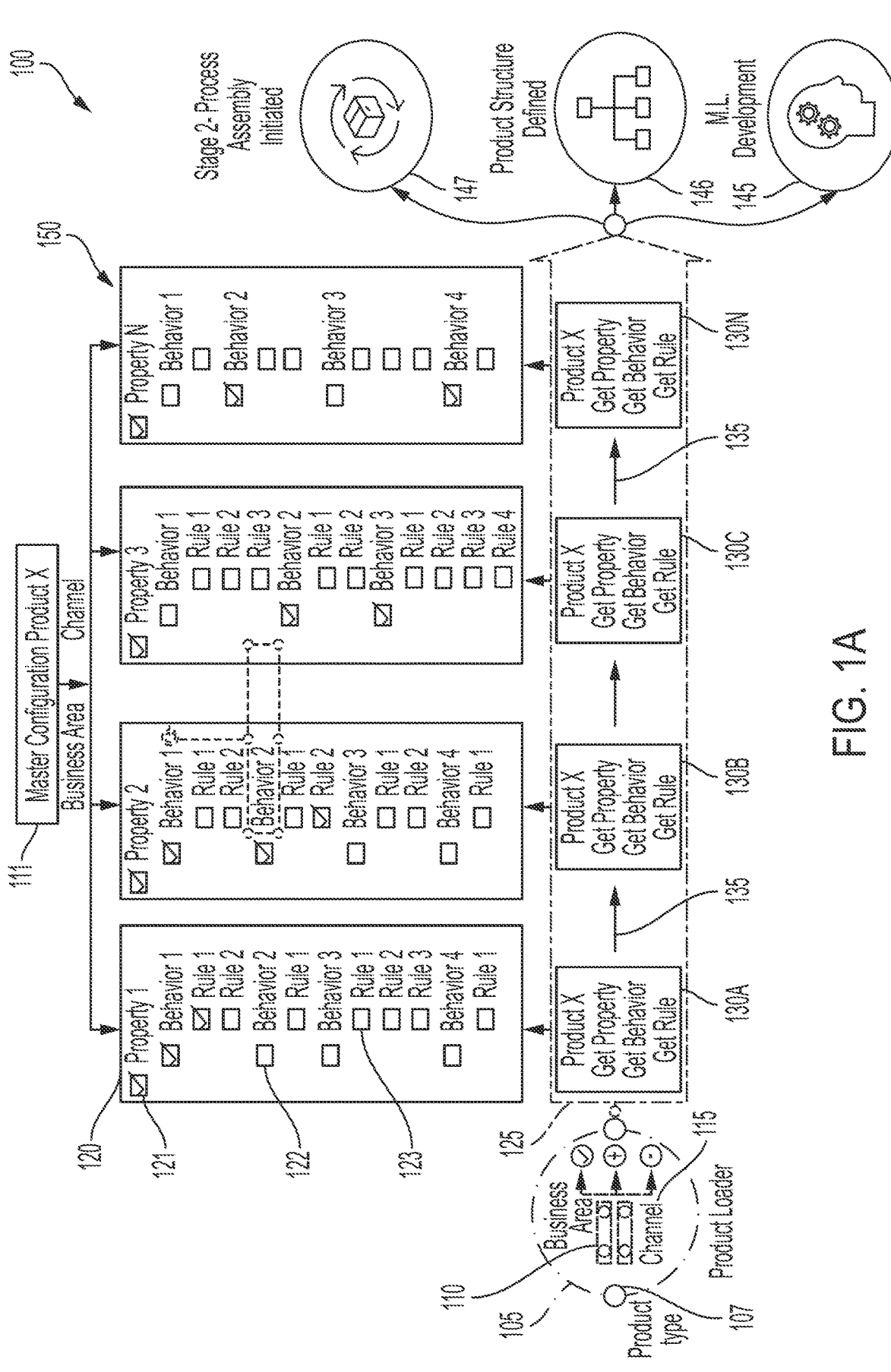

In one general aspect, the computer-based systems and methods of the present invention (variously referred to hereinafter as "presented technologies," "Client Onboarding Assembly Line," or "COAL") provide for dynamic and automated orchestration for assembling new and existing products/accounts of clients of, as one example, a wealth management firm, in an assembly line process. In particular, the final products/accounts can be embodied as data sets that can be used by various systems, as needed, of the wealth management firm. COAL streamlines and connects the processes of several separate systems into one unified, metadata-driven framework and reduces the time to configure, assemble and onboard all types of new and existing products/accounts of clients. It also provides repeatable, standardized, modular, and structured products/accounts and client services, thereby increasing flexibility of the wealth management firm to adapt to changes in product/account types, processes, and rules and increases the efficiency of service delivery.

In various embodiments, the assembly line contains two separate but connected dynamic stages of assembly that together build the products/accounts of the clients for the applicable management product/account, and machine learning based test beds that automatically detect and discard any incorrectly assembled outputs. In the first stage of the assembly process, the structure of the product/account is dynamically assembled based on product/account type, line of business, and user/application channel. The product/ account type may be different products/accounts for different types of entities. The entities could be individuals, trusts, charitable organizations, corporations, investment funds, escrow accounts, government entities, etc. The account types could be, for example, savings accounts, investment accounts, various tax-advantaged accounts (e.g., 401k, IRA, TAP 529 accounts, etc.), checking accounts, business accounts, brokerage accounts, merchant accounts, trust accounts, etc. The line of businesses could be, for example, retail or institutional investing, prime brokerage, investment banking, etc. The channel indicates the manner in which the user of the account accesses the account such as, for example, branch, mobile, self-service, e-banking, as but a few examples. Specifically, in various embodiments, a principal or master list of all potential properties and associated behaviors and rules is defined for each product/account type. As a request for a product/account of a client of a particular product/account type comes from a particular user/system channel in the firm for a particular line of business, the assembly line can dynamically tailor its assembly steps to this particular situation, i.e., it dynamically determines and applies a subset of properties, behaviors, and rules from the principal or master list to configure and define the product/ account's structure in accordance with the requirements of this particular product/account type, its business area, and system channel.

In the second stage assembly, onboarding processes that are applicable to the product/account of a client may then be dynamically performed based on the product/account type, line of business, and system/user channel. From a principal list of all onboarding processes, the assembly line, in various embodiments, dynamically determines the applicable onboarding processes and the product/account is updated with the results of the applicable onboarding processes.

In preferred embodiments, in both stages of the assembly, the assemblies leverage pipe-and-filter architecture alongside, in the case of the first stage assembly, a so-called "Pre-Main-Post" ("PMP") framework, to manage the two stages of assembly outputs. The pipe-and-filter architecture can includes multiple filters with pipes (or a pipeline) connecting the filters in series. The filters process incoming data and the pipes move the processed data from one filter to the next filter in the pipeline. The filters can comprise object-oriented classes that define functions that can be dynamically triggered to process the incoming data to the filter. The pipes can be, for example, objects that can automatically pass the output of one filter as the input to another filter. The pipes for the first and second pipe-and-filter data pipelines comprise an objected oriented class to trigger a current filter in the data pipeline, pass an output of the current filter as input to a next filter in the data pipeline, and trigger the next filed in the data pipeline. Each pipe preferably has a single source for its input and a single target for its output. It preserves the sequence of data items, and it does not alter the data passing through. The inputs and the outputs filters, which are propagated in the filter, can consist of sequential files containing lines of ASCII characters. As such, the pipeline preferably does not have a common data storage element for the filters.

The PMP framework can include predefined classification (categories of rules), main information (profiles, p2p specific data) and post functionalities rules/steps that can be used for various wealth management product/account types in the client onboarding processes. The pipe-and-filter architecture moves the product/account from one filter to another filter until it reaches the end of the assembly line. A filter or filter mechanism in this context essentially acts as a subassembly line and encapsulates the options and functions to dynamically configure a product/account property or an onboarding process/service. In various embodiments, the behaviors and rules of each product/account property and each onboarding process/service are first configured separately in their own filter, and then the configured properties and onboarding processes/services are combined together on the COAL to build the final outputs.

Artificial intelligence and machine learning (ML) capabilities are integrated in various embodiments with the assembly line to continuously learn the patterns for various product/account assemblies. The learned knowledge can be used to identify abnormal behaviors in the components of assembly line and prevent production failures. Faults in any processes can be identified automatically and corrected before the data are used or further modified. In various embodiments, AI and/or ML are continuously deployed at each stage and each filter, while at other embodiments, AI and/or ML are deployed at specific points in the COAL. Any and all points in COAL may be used for the deployment of AI or ML capabilities and models.

COAL provides several advantages over current client onboarding system, including unifying the assembly processes of different products/accounts into one assembly line (which may be divided into two stages), achieving the configuration of any wealth management or other software application product/account in any line of business from any user/system channel using the same facility, underlying systems and technologies, and providing self-orchestration of product/account assembly steps without manual or human intervention.

COAL also allows a modular and dynamic workflow for application and product development, whereby the features of products/accounts may be assembled and determined dynamically based on client requirements, whereby different properties, processes, and services to create various products/accounts without code/functionality level changes may be automatically and dynamically applied to the product/accounts or container of products/accounts. The modular and dynamic nature of COAL allows adaptability to changes in business processes, regulations, product/account types, client and growth of client base or scaling requirements without having to make changes to multiple systems. Making a change to this one system can apply changes either universally across all product/account types, which then can be pushed out to all clients. COAL also may use artificial intelligence and machine learning techniques to detect anomalies and prevent failures in product/account assembly.

These assembly lines can be tied into and require the use of the underlying computing technologies to function, preferably of several processors and several types of storage mechanisms. The assembly processes described in the presented technologies allow the personalization of products/account types and the use of these products/account types across a variety of businesses, types of end users, channels, along with integration with several other services, advisors, companies and programs. Because the assembly line is constricted by the dynamically run rules that are stored and pre-defined, in various embodiments as underlying metadata, these modular products/accounts and product/account containers may be automatically and dynamically created and put together based on the various rules, behaviors, and properties that are desired.

Without COAL as disclosed variously herein, writing code is necessary whenever a new product/account type is required or ordered by a client. When creating and running various separate product/account types, without a unified underlying system or language, and when these systems are then integrated into other third-party or external programs or services, additional computing and processing resources are required to run the various individual processes each of which use their own storage and memory solutions. COAL in various embodiments uses a unified structure and platform where one underlying system is used to allow the production of containers or product/account types, and then execute or run these product/account types based on a unified system of defined metadata, rules, properties, and behaviors that are associated with each other.

While COAL is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Figure 1B:
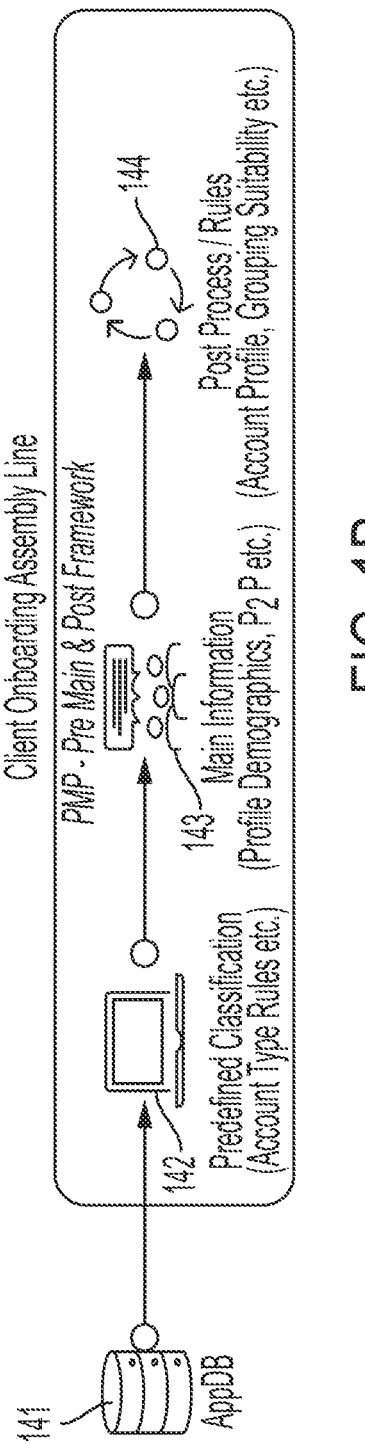

FIGS. 1A and 1B present, collectively, a first stage of an exemplary embodiment of a first stage product assembly process 100. The process 100 is dynamic and automated and in various embodiments, does not require human intervention. This first stage product assembly process 100 includes a first stage assembly system 150 made up of various filters 120 that add features to the data set for the product/account of a client for this first stage, and a pipeline 125 that moves the data set for the product/account of a client between different filters in the pipeline. The first stage product/account assembly process 100 includes a product loader 105, which receives a request for a product/account of a client for a product type 107 (product type is equivalent of different account type in wealth management business) for a client in business area 110 of the firm for a particular channel type 115. The channel 115 indicates the manner in which a user of the product/account of a client accesses the product/account. The product/account type, business area and channel can be considered, collectively, "assembler information" for the account of a client. The assembly process uses this assembler information to generate the final product/account of a client as described.

Once the product loader 105 receives the order, the order request (including the assembler information) may be transmitted to stage one of the assembly process, whereby the desired and/or required features of the product/account of a client are determined and configured at step 111 based primarily on the assembler information for the product/ account, including the product type 107, the business area 110, and the channel 115. In various other embodiments, other factors may be taken into consideration when configuring the first stage assembly line, including the client, the client type, client's underlying systems, current features the client may already possess, the system's knowledge of which additional or optional features may be useful, services to integrate the product/account with, and the like (collectively referred to herein as "other factors").

In several embodiments, the various possible products/ account types, product/account features, properties, and relationships between the rules, behaviors, and properties/ property characteristics are set out in a master list, and the first stage assembly system 150 identifies all the product/ account features that are applicable to the product/account of a client based on the assembler information therefor, along with the features' associated rules, behaviors and properties, based on the assembler information and in some embodiments, other factors as described above.

For example, a particular product/account type may have several pre-defined properties 121, such as client owner name, ID (e.g., SSN or Tax ID), etc. These properties are denoted in FIG. 1A as Properties 1, 2, 3 .... N in FIG. 1A, and they are preset in the master list 120. Each property might have one or more selected behaviors 122 that are applicable to the property for the given product/account type; and each behavior 122 might have one or more selected rules 123 that are applicable to a selected behavior for the property for the product/account type. Each property 121 for the product/account type may be associated with one filter in the pipeline. Each filter pipeline can add to the product/account (or data set) the relevant data for the specified rule(s) for the specified behavior(s) for the property associated with the filter. With reference to FIG. 1A, filter 130A is associated with Property 1 for the particular assembler information. As shown in the example of FIG. 1A, Property 1 has several potential behaviors, with each behavior having one or more potential rules. Based on the assembler information for the product/account of a client, the applicable behavior and rules are selected, e.g., dynamically configured. In the example of FIG. 1A, Rule 1 of Behavior 1 applies for Property 1 given the assembler information for the product/account of a client. The filter 130A can add to the product/account data to define Rule 1 for Behavior 1 for Property 1 in this example. Then the next filter in the pipeline, filter 130B, can add to the product/account the data for, in the example of FIG. 1A, to define Rule 2 of Behavior 2 for Property 2. This process is performed for each applicable property-filter in the pipeline until the final product/ account structure is defined, although it should be recognized that certain properties may not apply for a particular set of assembler information, so the filters for those inapplicable properties would not be used to define the product/ account structure. Note also that some properties might have multiple applicable behaviors, for which there is an associated rule. The final result from Stage 1, after processing the data set through all of the applicable filters based on the input assembler information, a product/account structure definition 146 for the product/account of a client.

For example, the first filter 130A can be executed to add one or more desired or required product/account features that in preferred embodiments contain the associated properties, behavior(s), and rule(s) for the product/account type given the assembler information for the product/account of a client. Once the first filter 130A operates on the pipeline data flow, the updated product/account is transferred via the pipeline 135 to the next filter 130B via the pipeline that connects the two filters to each other. The process is then repeated at the next filter 130C whereby the next filter 130C also is executed to add the data applicable for Property 3. This process continues until the last filter 130N, wherein after the final filter 130N is executed, the final product/ account for stage 1 is complete. In various embodiments, a machine learning (ML) algorithm 145 is executed to ensure that the properties added by each filter 130A-N were done so correctly, with the correct implementation of properties, behaviors, and rules given the product/account type. The ML algorithm 145 can also ensure that there are no anomalies in the process by identifying and correcting (or discarding) any anomalies it finds. The ML algorithm 145 can continuously learn over continuous ML trainings as well as various product/account creation cycles, universal set of rules to apply to the total line of products/accounts or combination of products/accounts available and the processes to assemble and onboard these products/accounts into their final form. The ML algorithm 145 may learn the best combinations of products/accounts, features, properties, behaviors, and rules. In some embodiments, the ML algorithm 145 is deployed not after all the filters 130A-N have been executed by after or alongside the execution of each filter on the data object (e.g., the product/account in the pipeline to which the respective filters add the software and data for the associated property) to ensure that the execution of that particular filter did not create anomalies in the process. The example of FIG. 1A includes four filters 130A-N; in other embodiments, a different number of filters (more or less) could be used in the pipeline 125 for a particular product/account type.

The product/account structure 146 for the product/account type is defined after the final filter 130N is executed and there are no anomalies in the process as determined by the ML algorithm 145. The final structure definition of the product/account can be a skeleton that identifies exactly what features and associated properties, behaviors, and rules have been collected and finalized as part of the defined product/account type that will ultimately be generated. After the product/account structure is defined at step 146, a second stage onboarding assembly process is initiated 147.

In various embodiments, this first stage assembly process 100 may run according to a Pre-Main-Post assembly framework 140 (PMP). This PMP framework 140 relies on a database 141, which defines the Pre-Main-Post structure that can be defined in three stages. The 'Pre' stage 142, which includes predefined classifications stored in database 141. These may include defined classifications of each product/ account type, container, and suite of products/accounts, the associations between properties, behaviors, and rules as well any lists or master lists that are used to classify product/ account types. In several embodiments, there are a finite number of defined combinations based on the predefined classifications or product type/account type/properties. The 'Main' information stage 143 of the PMP framework relates to information related to the party/client for which the product/account type is being defined. The "Post" process stage 144 is for additional information and processes besides information from the pre and main stages.

Figure 2:
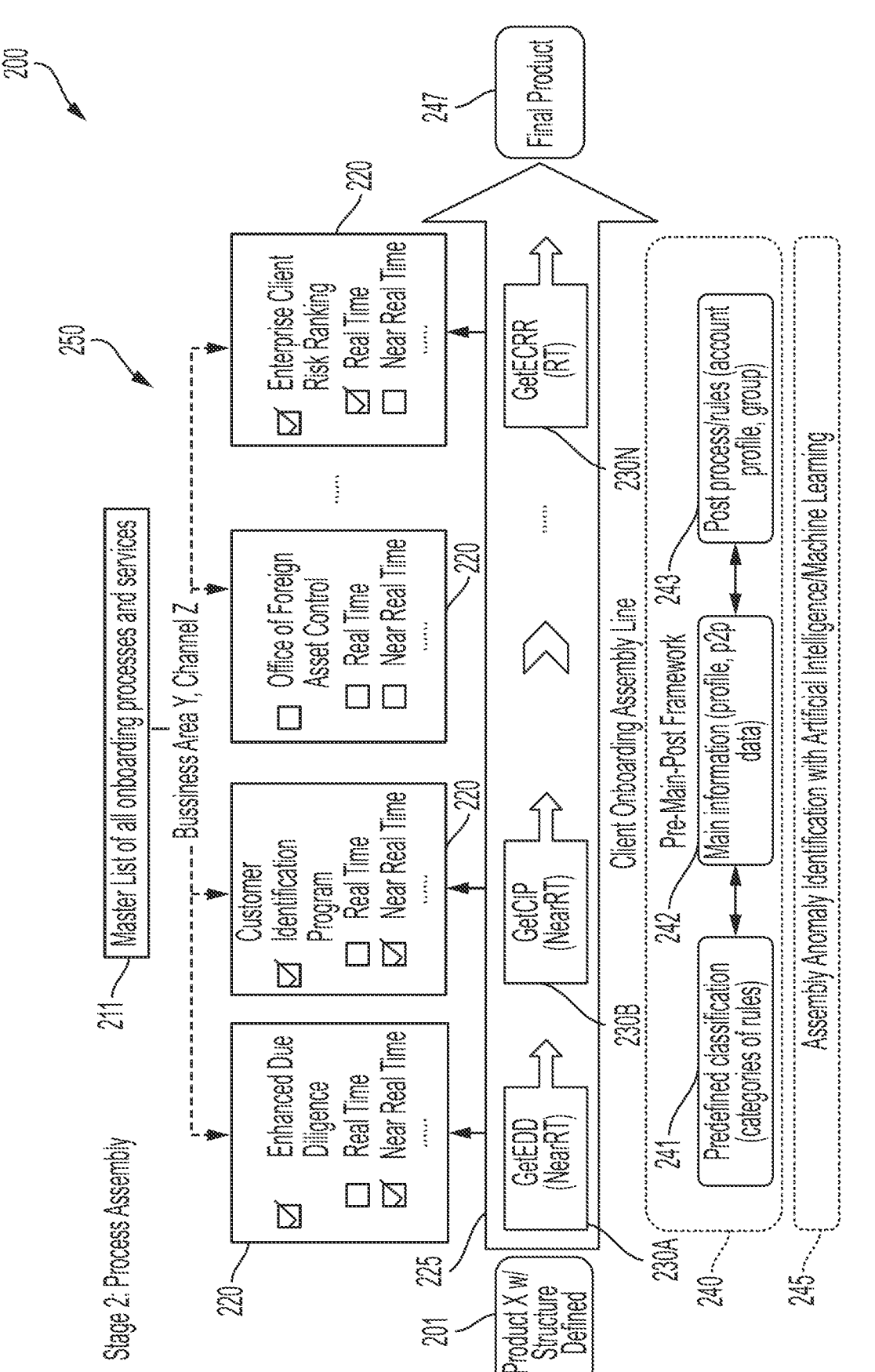

FIG. 2 presents an exemplary embodiment of a second stage onboarding assembly process 200. Once a product/ account's structure is defined in the first stage assembly process 100 as defined by the exemplary embodiment of FIGS. 1A-B, the structurally defined product/account 201 then must be on-boarded onto a system of the firm. This is carried out by the onboarding assembly system 250. Once a product/account type is defined at stage 1, then the onboarding processes and services are determined at step 211 from a pre-defined master list of all applicable onboarding processes and services, which determination can be made based on the defined structure of the product/account 201, i.e., the features it contains, its properties, rules, behaviors, and in many embodiments, the initial product order, the business area of the client, the channel and/or other factors. The product/account is transmitted into the onboarding assembly system 250, which has a filter 230A-N for each applicable onboarding process/service for the product/account type. As with stage 1, the filters 230A-N can add to the product/account, in pipeline fashion, the applicable data for each of the applicable onboarding processes/services for the product/account. The onboarding assembly system 250 is comprised of a number of selected onboarding processes and services 220 from the master list 211 of onboarding processes/services, with each two sequential filters in the pipeline connected via a pipe 225, which transports the data object for the product/account between them. As the product/account 201 is transmitted through the system 250 the first filter 230A is executed to add the applicable data for the first onboarding process/service, which in this example is that enhanced due diligence needs to be performed, and in near-real time (as opposed to in real-time). Once this onboarding process is completed the product/account 201 is then transmitted through pipe 225 to the next filter 230B where the filter 230B is executed on the product/account 201 to add the data from the second onboarding process/service, which in this example is a customer identification program to be performed in near real-time. The process is repeated, sequentially along the pipeline 230A-N, for each applicable onboarding process/service. Once all the onboarding services have been performed, at the last filter or filter mechanism 230N, the final product for the (new or existing) account of a client is output and pushed out to the firm. The final product/account can be a dataset includes the data from the first stage filters and the second stage filters.

In addition, AI and machine learning algorithms 245 may be used either at each filter stage 230A-N or after all onboarding processes have been performed on the product/account 201. The AI/ML algorithm 245 identifies, detects and corrects any anomalies in the process 200 and ensures that all relevant onboarding processes are performed, and performed correctly. The ML algorithm 245 learns over ML training as well as on repeated onboarding processes to determine the most relevant onboarding processes and services as well as any corrections or anomalies that need correction or discarding.

The filters 130A-N and the filters 230A-N are dynamic for a particular product/account based on the information for the product/account, particularly the product/account type 107, the business area 110 and the channel 115. That is, a first product/account that has a first combination of product/account type, business area and channel, will have a different combination of filters 130A-N, 230-A-N than for a second product/account with a second, different, combination of product/account type, business area and channel, due to the different applicable properties in the master list 120 and the different onboarding processes in the master list 211 for different combinations of product/account type, business area and channel.

Figure 3B:
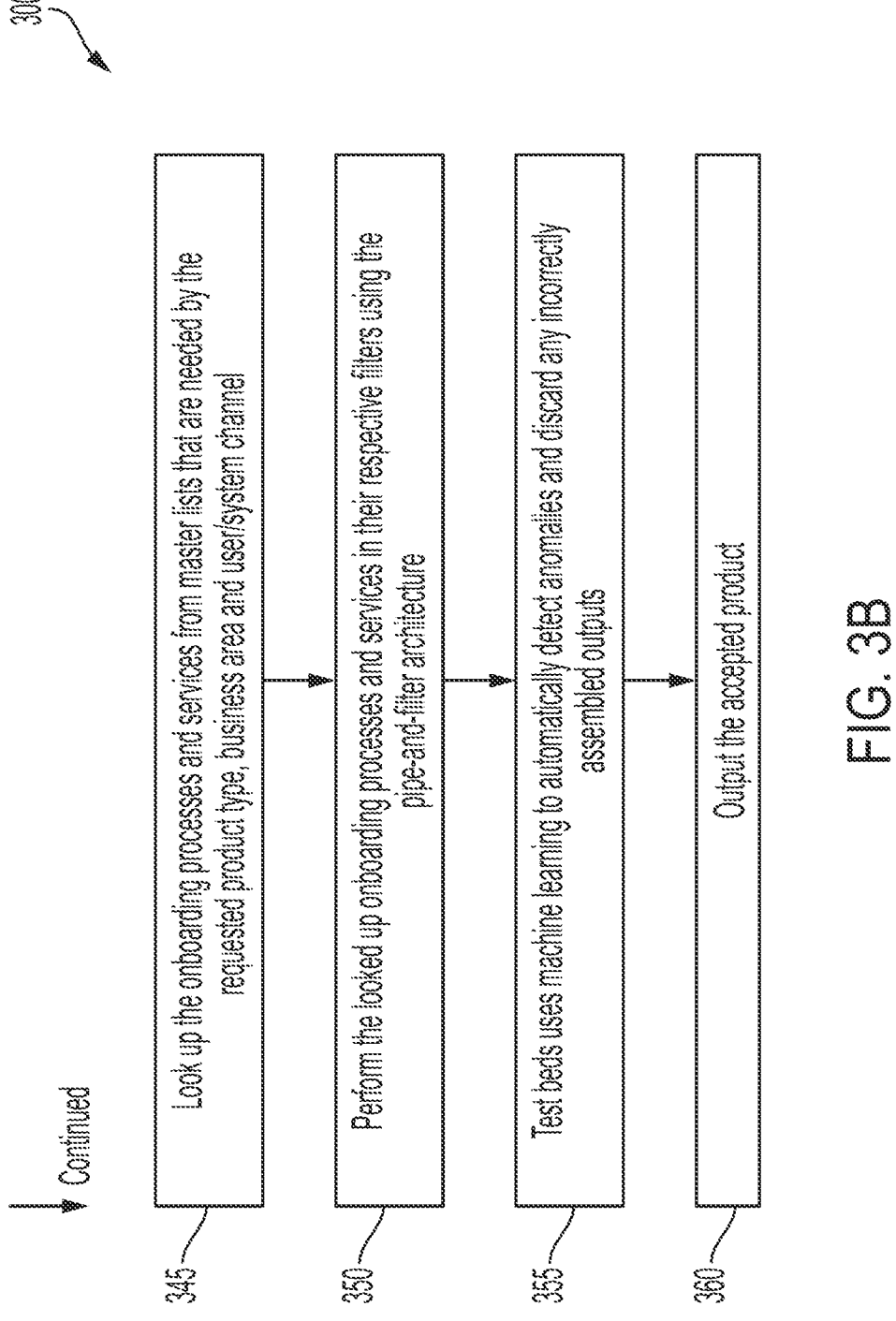

FIG. 3A-3B present collectively one embodiment of the Pre-Main-Post framework process to assemble a product/ account type. In this embodiment, a request for an application product/account of type X is received at step 310, the product/account type X being in a business area Y of the firm and a user/system channel Z. Once the product/account request is received at step 310, the Pre-Main-Post framework may be initiated. The Pre-stage of the PMP framework is made up of two steps, the first is looking up, at step 315, the properties, behaviors, and rules from master list(s) that contain pre-defined categories of rules for the product type X, the business area Y and user/system channel Z received by the product/account request. Some examples may include, account classifications, roles and account features. Once these are found, the applicable filters 130A-N for the first stage configured the product/account to have the applicable rules for the applicable behaviors for the applicable properties for the product/account type, given the business area Y and user/system channel Z.

In several embodiments, in the Main stage of the PMP process, the properties, behaviors, and rules specific to each profile attribute are looked up at step 325 and identified as needed by the requested product type X, business area Y and user/system channel Z. After these are looked up 325 then these identified properties, behaviors, and rules are configured at step 330 in each respective filter to create the 'Main' segment of the PMP framework. Finally, the 'Post' segment of the first assembly process includes looking up at step 335 the properties, behaviors, and rules from the master list(s) that include post functionality details for requested product type X, business area Y, and user/system channel Z. These post functionality details may include account profile details, external features, discretionary roles, and profile rules specific to X, Y and Z. These are then configured at step 340 by the applicable filters in the pipe-and-filter pipeline. As discussed above, the product/account data object that is created may have different filters executed on it in series, or in some embodiments in parallel. In some embodiments all the Pre-Main-Post filters must be assembled and configured then be executed on the product/account data object to define its structure, while in other embodiments, the configuration steps 320, 330, and 340 themselves execute or perform the filters or filter mechanisms that add these properties and their associated behaviors, and rules to the data object.

In FIG. 3B, the second stage onboarding assembly process is executed, which first requires looking up at step 345 the onboarding processes and services from master lists to determine the required features of the requested product type X, of business area Y, and user/system channel Z. The onboarding process(es) are then performed at step 350 on the defined product/account, container or data object whereby each filter or filter mechanism configures the product/account to implement the onboarding process/service corresponding to the filter and then transmits the product/account data object to the next filter or filter mechanism. Test beds may then be used to detect at step 355 anomalies automatically using machine learning, and after detection, these anomalies may be corrected or discarded. Finally, the completed on-boarded product/account is output at step 360.

Figure 4:
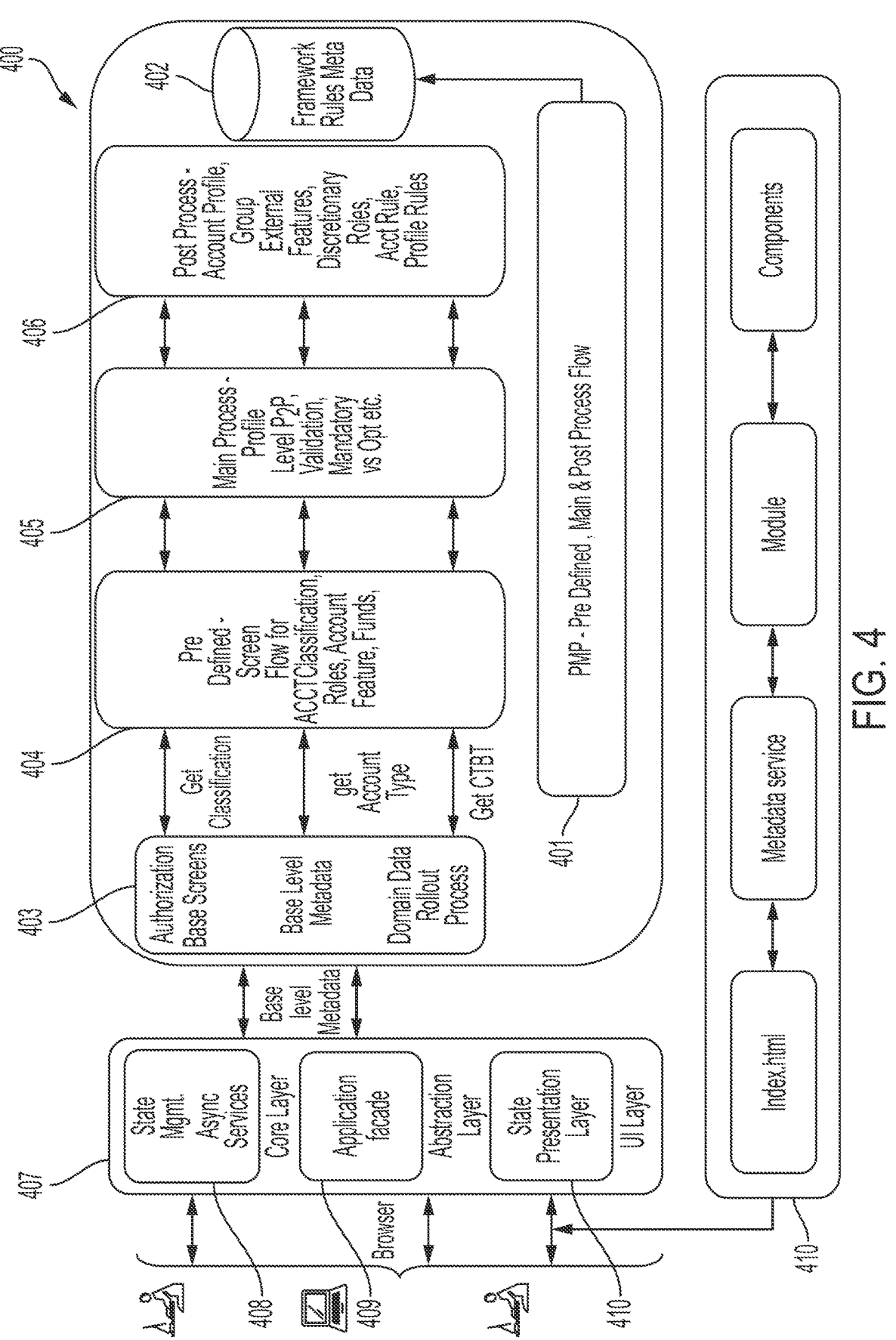

FIG. 4 presents one embodiment of the PMP framework architecture meant for supporting different account types in wealth management business 400 that may be utilized by the assembly processes in COAL. The PMP process flow 401 can be a combination or various pre, main and post processes, which may be defined by framework rules metadata 402. The process flow 401 is made up of a combination of base level metadata 403, pre-defined processes 404, main processes 405, and post-processes 406. The application layers 407 may be made up of a core layer 408, an abstraction layer 409, and a UI layer 410. The core layer 408 may include state management and/or asynchronous services, which may be modifiable, or accessible by an administrator or administrator level user. An application abstraction layer may be used by browsers, applications or other software to run the library, and a UI layer is presented to the end user. Various other external services may also be integrated into or plug-into the library that is produced by the PMP process flow. These external services may themselves include other applications, services, or third-party software that integrates with the output of the PMP framework architecture 400.

Figure 5:
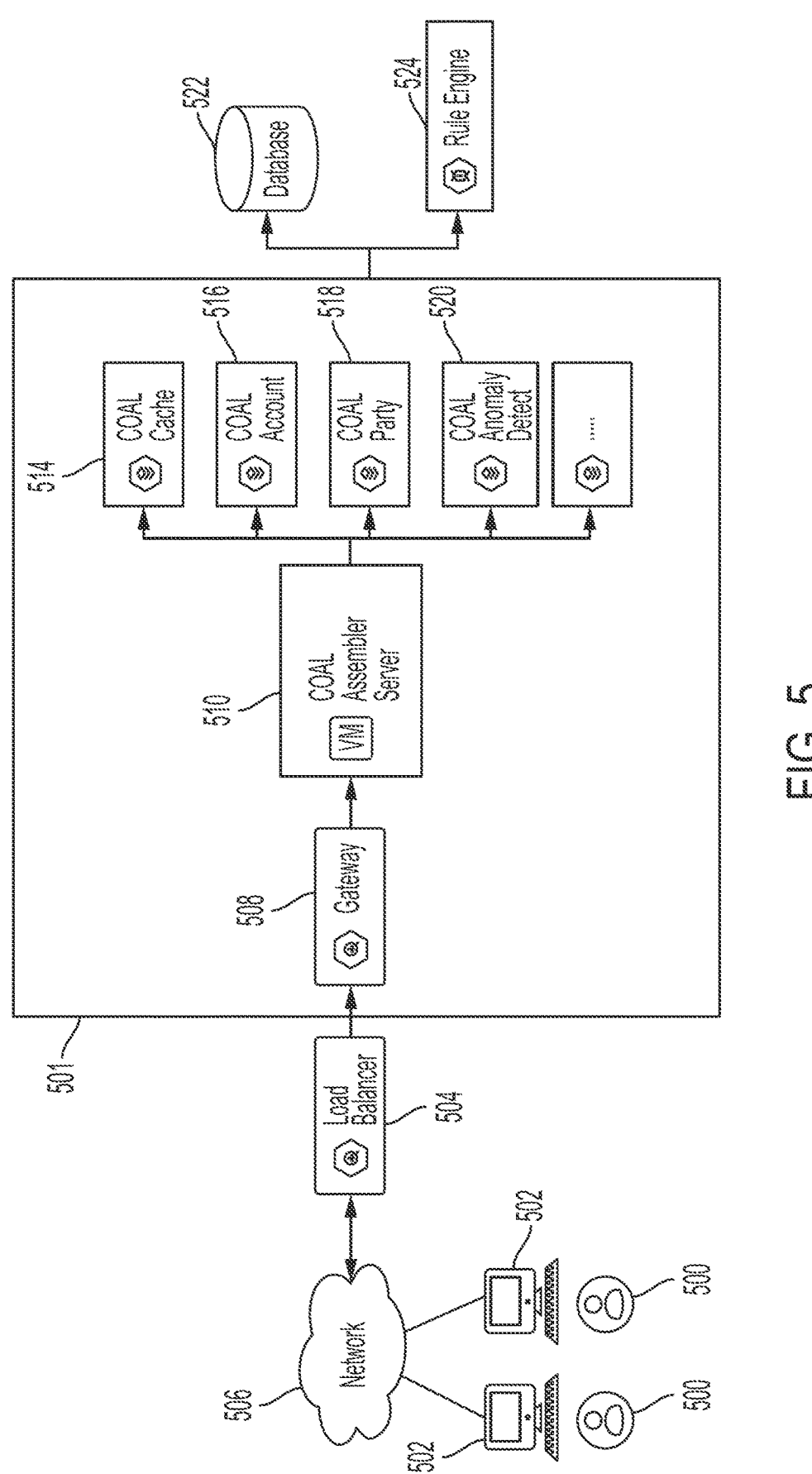
FIG. 5 depicts a distributed computing network with a computer system for assembling the products according to various embodiments of the present invention.

FIG. 5 depicts a distributed computing network through which any users 500, such as clients, financial advisors, client services associates, etc., can create and manage different wealth management products (e.g., account types). The users 500 can submit product/account assembly request via the respective users' devices (e.g., network-connected computing devices, such as laptops, PCs, etc.) 502, which are connected the COAL server system 501 via a load balancer 504 and an electronic data network 506 (such as a LAN or a WAN, for example). The load balancer 504 controls the traffic from the users 500 to the servers of the server system 501. In particular, the load balancer 504 forwards requests from the users 500 to a gateway 508 of the system 501. The gateway 508 routes any requests to the respective server. In this case, when a product/account needs to be configured, the gateway 508 routes the product/account assembly request and information to the COAL assembler server 510. The COAL assembler server 510 is responsible for assembling the frame of the product/account in stage 1 and performing the onboarding processes and services in stage 2 as described above. It is connected to multiple containers that support various parts of the assembly.

The containers include, for example, a COAL cache container 514, which leverages progressive caching, which caches product/account/process data uniquely for each user based on his/her product/account type, business area and channel. A COAL account container 516 orchestrates any account-related data and attributes required by COAL assembler server 510. In stage 1, based on product/account type, business area and channel, the COAL account container 516 can manage and provide a uniquely consolidated set of required properties and the associated behaviors and rules. In stage 2, based on the product/account structure, it can manage and provide a uniquely consolidated set of the onboarding processes and services required for the product/account.

A COAL party container 518 orchestrates any party-related data and attributes required by COAL Assembler Server. In stage 1, based on product/account type, business area and channel, the COAL party container 518 can manage and provide a uniquely consolidated set of required properties and the associated behaviors and rules. In stage 2, based on the product/account structure, it manages and provides a uniquely consolidated set of the onboarding processes and services required for the client.

A COAL anomaly detection container 520 detects any incorrectly performed assembly. More details about anomaly detection are provided in connection with FIG. 6. Other containers can be developed to facilitate the above configurations and assemblies.

Various properties and the associated behaviors and rules are configured in multiple tables in a database 522. In addition, a rule engine 524 can specifies the various complex business processes of onboarding processes and services.

Figure 6:
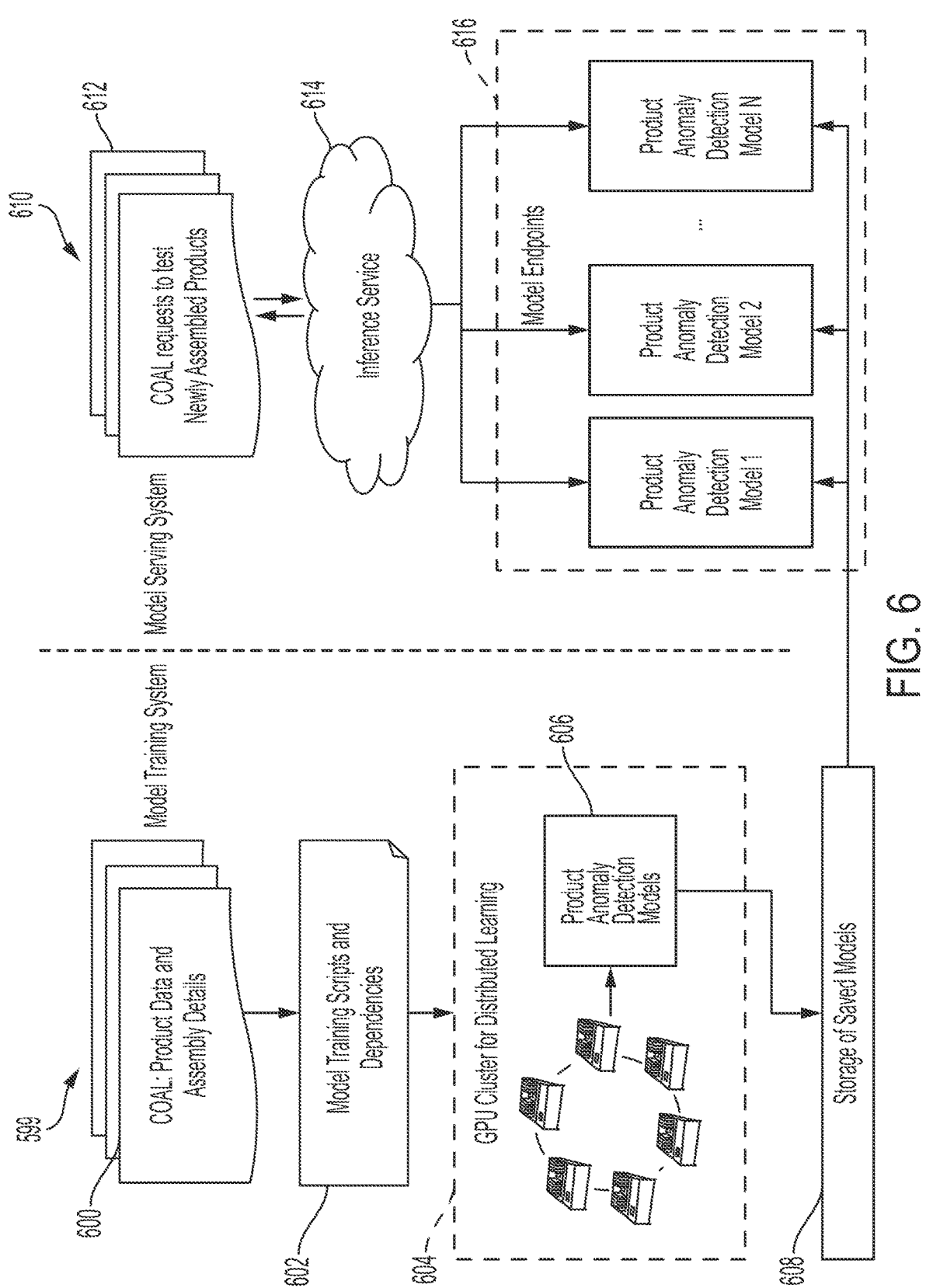
FIG. 6 illustrates systems for training and implementing anomaly detection models according to various embodiments of the present invention.

FIG. 6 is a diagram of a model training system 599 for training the ML models that detect anomalies in COAL, such as the ML model 145 in FIG. 1A and model 245 in FIG. 2. The model training system uses COAL's product/account data and assembly details 600, such as from previously generated products/account types, as the training data for the anomaly models. These data are fed to model training scripts and dependencies 602 to implement the learning. Any suitable machine learning algorithm to train the anomaly detection models, such as, but not limited to, isolation forest, support vector machine, neural networks, DBSCAN, k-nearest neighbors, autoencoder, etc. The learning can be done in a distributed manner with a cluster 604 of GPUs, where the data or the model can be broken into parts and trained in parallel to optimize usage of compute resources and training time. The output of the learning process are anomaly detection models 606 for the processes of COAL and the products/accounts assembled by COAL. These models 606 are saved in a model storage 608 to be consumed by COAL.

FIG. 6 also depicts a model serving system 610 that is responsible for detecting anomalies of the process of COAL and the products/accounts assembled. The COAL system described in connection with FIGS. 1A-1B and 2 can generate application (e.g., HTTP) requests 612 to detect any anomaly of newly assembled products/accounts. The application requests 612 can be sent to an inference service/API gateway 614. The inference service 614 can route the requests to the corresponding anomaly detection model endpoints 616 that fulfill such requests. Multiple anomaly detection model endpoints can be developed and exposed, where each model endpoint can be used to detect some type of anomaly in COAL: whether a product/account type is assembled as it should, whether a filter is working correctly, etc. That is, for example, the model 145 in FIG. 1A and the model 245 in FIG. 2 can each be implemented with multiple model endpoints, with each model endpoint trained to detect a particular anomaly, using a corresponding model 606 stored in the model storage 608.

In various embodiments, the models 606 may be trained through supervised training, in which the training data are labeled, through unsupervised training, and/or semi-supervised training. For supervised training, the labeled training items could include both positive (i.e., anomalous) and negative (non-anomalous) training examples.

The computer systems described herein may comprise a single or multiple processor units that each comprises one or multiple processor cores. Each processor unit may comprise onboard memory (ROM or RAM) and off-board memory. The onboard memory may comprise primary, volatile, and/or non-volatile storage (e.g., storage directly accessible by the processor cores). The off-board memory may comprise secondary, non-volatile storage (e.g., storage that is not directly accessible by the processor cores), such as ROM, HDDs, SSD, flash, etc. The processor cores may be CPU cores, GPU cores and/or AI accelerator cores.

The software for the various machine-learning systems described herein and other computer functions described herein may be implemented in computer software using any suitable computer programming language, such as .NET, C, C++, or Python, and using conventional, functional, or object-oriented techniques. For example, the various machine learning systems may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective machine learning system (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present inventions are directed to computer systems and computer implemented methods for automatically configuring and onboarding a product/account and a client of a firm. According to various embodiments, the method comprises the step of receiving, by a client and product/account assembly computer system, from a product loader, a request for the product/account of the client. The request includes information for the product/account of the client, where the information comprises a product/account type for the product/account, an entity type for the client, a business area of the firm requesting the account of the client, and a channel for the product/account of the client. The method also comprises the step of, based on the request, generating, by the client and product/account assembly computer system, a product/account structure for the account of the client.

Generating the product/account structure comprises determining applicable rules for the product/account of the client: where the applicable rules are determined based on applicable behaviors for applicable properties for the product/account type; and where the applicable properties, the applicable behaviors and the applicable rules are determined based on the information for the product/account of the client from the request for the product/account of the client, and according to a pre-specified master list of properties, behaviors and rules for the product/account type, the business area and the channel for the product/account of the client. Generating the product/account structure also comprises processing product/account structure data for the product/account of the client with a first set of dynamically triggered serial filters in a first data pipeline using pipe-and-filter pattern. Processing the product/account structure data comprises updating the product/account structure data with the first set of dynamically triggered serial filters such that the product/account structure data, after being processed by the first set of dynamically triggered serial filters, comprises product/account structure data corresponding to the applicable rules for the product/account of the client.

The method also comprises, after generating the product/account structure for the product/account of the client, the step of generating by the client and product/account assembly computer system, a final product/account of the client. Generating the final product/account comprises processing the product/account structure with a second set of dynamically triggered serial filters in a second data pipeline using the pipe-and-filter pattern. Processing the product/account structure comprises updating the product/account structure with the second set of dynamically triggered serial filters such that the product/account structure, after being processed by the second set of dynamically triggered serial filters, comprises data for applicable onboarding processes for the product/account of the client, where the applicable onboarding processes are determined based on the information in the request for the product/account of the client and according to a pre-specified master list of onboarding processes for the product/account type, the business area and the channel for the product/account of the client, such that the final product account comprises a data set for the account of the client for the business area and the channel for the product/account of the client.

According to various implementations, the client and product/account assembly computer system comprises one filter in the first set of serial filters for each applicable property for the product/account of the client, such that the one filter for each applicable property processes the product/account structure data to update the product/account structure data to implement at least one applicable rule for the applicable property for the product/account of the client.

In such implementations, the client and product/account assembly computer system can comprise one filter in the second set of serial filters for each applicable onboarding process for the product/account of the client, such that the one filter for each applicable onboarding process processes the product/account structure to update the product/account structure with data from the onboarding process for the product/account of the client.

According to various implementations, the first set of serial filters comprises object-oriented classes that define functions that can be dynamically triggered to update the product/account structure data with the properties associated with the requested product/account types. The second set of serial filters comprises object-oriented classes that define functions that can be dynamically triggered to update the product/account structure data with the onboarding processes and services associated with the requested product/account types. The pipes comprise an object-oriented class that contains a function that triggers the current filter, passes the output of the current filter as the input to the next filter, and triggers the next filter in a data pipeline.

According to various embodiments, the method further comprises the steps of: prior to generating the final product/account, training, by the client and product/account assembly computer system, through machine learning, multiple machine learning systems to validate the final product/account; and after training the multiple machine learning systems, validating, by the multiple machine learning systems, the final product/account.

The above-described process could also be used to automatically configure and onboard a product/account of a second client of the firm. The filters in the data pipelines for the second client are different than the data pipelines for a first client, where the first and second clients have a different combination of product/account type, business area and channel. That is because the master lists will be different for the two clients due to their different combinations of product/account type, business area and channel, which causes the applicable filters to be different for each client.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, or logical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for automatically and dynamically configuring and onboarding clients and accounts of a firm, the method comprising:

receiving, by a client and account assembly computer system, from a computer-implemented product loader, a request for the account creation for a of the client, wherein the product loader is configured to receive account-creation requests from multiple channels of the firm for different product types, account types, and channel types, and wherein the request includes information for the account of the client, wherein the information comprises an account type for the account, and wherein the information comprises metadata about the account, wherein the metadata comprise an entity type for the client, a business area of the firm requesting the account, and a channel for the account of the client;

based on the request, generating, by the client and account assembly computer system, an account structure for the account of the client, wherein the account structure comprises applicable account-assembly properties, behaviors and rules based on the metadata and based on a pre-defined master list of properties, behaviors, and rules, wherein generating the account structure comprises:

determining the applicable account-assembly properties, behaviors and rules for the account structure by applying a framework, the framework comprising:

(i) a pre-classification component that dynamically determines account type, eligibility, and rule categories based on the metadata;

(ii) a main processing component that aggregates client profile and demographic data; and (iii) a post-processing component that validates the profile, performs account grouping, and applies suitability rules using dynamically configurable business rules; and processing account structure data for the account with a first set of dynamically triggered serial software-implemented filters in a first data pipeline using a pipe-and-filter pattern, wherein:

the data pipeline comprises a plurality of serial software-implemented filters, each filter embodied as an object-oriented class stored in memory of the client and account assembly computer system, the class including instructions that, when executed, update the account structure data of an account object resident in the memory;

each software-implemented filter is mapped to a distinct property defined in a pre-specified master list of properties, the mapping causing the filter to add property-specific configuration data and associated rule data to the account object during execution;

the software-implemented filters are dynamically triggered and reconfigured based on metadata in the client account request, thereby modifying an execution order of the pipeline without redeploying the system; and a resulting account structure data comprises a mutated account object containing property-specific executable instructions and rule data corresponding to the applicable rules for the account of the client; and after generating the account structure for the account of the client, generating by the client and account assembly computer system, a final account, wherein generating the final account comprises processing the account structure with a second set of dynamically triggered serial software-implemented filters in a second data pipeline using a pipe-and-filter pattern, wherein processing the account structure comprises:

validating, by a machine-learned anomaly detection model stored in the memory and trained on historical onboarding outcomes, the account object as it exits the second pipeline, the validating comprising:

monitoring data and stat of the account object as updated by the second set of filters;

reviewing the data and state of the account object for consistency with learned account structure patterns and applicable rules and requirements, such that upon detection of a deviation or orchestration fault, the account object is correctable prior to finalization; and updating the account structure, upon successful validation, by executing the second set of dynamically triggered serial software-implemented filters arranged in a pipe-and-filter architecture, wherein each dynamically triggered serial software-implemented filter in the second set is implemented as an object-oriented class that, when invoked, adds executable onboarding instructions into the account object, updates onboarding-related data fields of the account object, and passes an updated object sequentially through a pipe to a next filter, wherein the applicable onboarding processes and services are selected by a rule engine from a pre-specified master list of onboarding processes and services, selection being based on metadata in the client account request specifying the account type, business area, and channel; and wherein execution of the second set of filters produces a final account object stored in the memory, the final account object comprising a complete, validated data structure containing executable code, service bindings, and configuration data required for immediate use of the account in its specified business area and channel.

2. The method of claim 1, wherein the client and account assembly computer system comprises one software-implemented filter in the first set of serial software-implemented filters for each applicable property for the account of the client, such that the one software-implemented filter for each applicable property processes the account structure data to update the account structure data to implement at least one applicable rule for the applicable property for the account of the client.

3. The method of claim 2, wherein the client and account assembly computer system comprises one software-implemented filter in the second set of serial software-implemented filters for each applicable onboarding process for the account of the client, such that the one software-implemented filter for each applicable onboarding process processes the account structure to update the account structure with data from the onboarding process for the account of the client.

4. The method of claim 1, wherein pipes for the first and second pipe-and-filter data pipelines comprise an objected oriented class to trigger a current software-implemented filter in the data pipeline, pass an output of the current software-implemented filter as input to a next software-implemented filter in the data pipeline, and trigger the next software-implemented filter in the data pipeline.

5. The method of claim 1, further comprising:

prior to generating the final account object, training, by the client and account assembly computer system, through machine learning, multiple machine learning systems to validate the final account object; and after training the multiple machine learning systems, validating, by the multiple machine learning systems, the final account object.

6. The method of claim 1, wherein the account type is an investment account and the firm is a wealth management firm.

7. A computer system for automatically and dynamically configuring and onboarding clients and accounts of a firm, the computer system comprising:

one or more processors; and a memory in communication with the one or more processors, wherein the memory stores instructions that, when executed by the one or more processors, cause the one or more processors to:

receive, from a computer-implemented product loader, a request for account creation for a client, wherein the request includes information for the account of the client, wherein the product loader is configured to receive account-creation requests from multiple channels of the firm for different product types, account types, and channel types, and wherein the information comprises an account type for the account, and wherein the information comprises metadata about the account, wherein the metadata comprise an entity type for the client, a business area of the firm requesting the account, and a channel for the account;

based on the request, generate an account structure for the account of the client, wherein the account structure comprises applicable account-assembly properties, behaviors and rules based on the metadata and based on a pre-defined master list of properties, behaviors and rules, wherein the one or more processors are configured to generate the account structure by:

determining the applicable account-assembly properties, behaviors and rules for the account structure by applying a framework, the framework comprising:

(i) a pre-classification component that dynamically determines account type, eligibility, and rule categories based on the metadata;

(ii) a main processing component that aggregates client profile and demographic data; and (iii) a post-processing component that validates the profile, performs account grouping, and applies suitability rules using dynamically configurable business rules; and processing account structure data for the account with a first set of serial software-implemented filter that are dynamically triggered in a first data pipeline a using pipe-and-filter pattern, wherein;

the data pipeline comprises a plurality of serial software-implemented filters, each filter embodied as an object-oriented class stored in memory of the client and account assembly computer system, the class including instructions that, when executed, update the account structure data of an account object resident in the memory:

each software-implemented filter is mapped to a distinct property defined in a pre-specified master list of properties, the mapping causing the filter to add property-specific configuration data and associated rule data to the account object during execution;

the software-implemented filters are dynamically triggered and reconfigured based on metadata in the client account request, thereby modifying an execution order of the pipeline without redeploying the system; and a resulting account structure data comprises a mutated account object containing property-specific executable instructions and rule data corresponding to the applicable rules for the account of the client; and after generating the account structure for the account, generate a final account, wherein generating the final account comprises processing the account structure with a second set of serial software-implemented filters that are dynamically triggered in a second data pipeline using a pipe-and-filter pattern, wherein processing the account structure comprises:

validating, by a machine-learned anomaly detection model stored in the memory and trained on historical onboarding outcomes, the account object as it exits the second pipeline, the validating comprising:

monitoring data and stat of the account object as updated by the second set of filters;

reviewing the data and state of the account object for consistency with learned account structure patterns and applicable rules and requirements, such that upon detection of a deviation or orchestration fault, the account object is correctable prior to finalization; and updating the account structure, upon successful validation, by executing the second set of dynamically triggered serial software-implemented filters arranged in a pipe-and-filter architecture, wherein each dynamically triggered serial software-implemented filter in the second set is implemented as an object-oriented class that, when invoked, adds executable onboarding instructions into the account object, updates onboarding-related data fields of the account object, and passes an updated object sequentially through a pipe to a next filter, wherein the applicable onboarding processes and services are selected by a rule engine from a pre-specified master list of onboarding processes and services, selection being based on metadata in the client account request specifying the account type, business area, and channel; and wherein execution of the second set of filters produces a final account object stored in the memory, the final account object comprising a complete, validated data structure containing executable code, service bindings, and configuration data required for immediate use of the account in its specified business area and channel.

8. The computer system of claim 7, wherein the computer system comprises one software-implemented filter in the first set of serial software-implemented filters for each applicable property for the account of the client, such that the one software-implemented filter for each applicable property processes the account structure data to update the account structure data to implement at least one applicable rule for the applicable property for the account of the client.

9. The computer system of claim 8, wherein the computer comprises system one software-implemented filter in the second set of serial software-implemented filters for each applicable onboarding process for the account of the client, such that the one software-implemented filter for each applicable onboarding process processes the account structure to update the account with data from the onboarding process for the account of the client.

10. The computer system of claim 7, wherein pipes for the first and second pipe-and-filter data pipelines comprise an objected oriented class to trigger a current software-implemented filter in the data pipeline, pass an output of the current software-implemented filter as input to a next software-implemented filter in the data pipeline, and trigger the next filter in the data pipeline.

11. The computer system of claim 7, wherein the memory stores instructions that when executed by the one or more processors cause the one or more processors to:

prior to generating the final account object, train, through machine learning, multiple machine learning systems to validate the final account object; and after training the multiple machine learning systems, validate the final account object with the multiple machine learning systems.

12. The computer system of claim 7, wherein the account type is an investment account and the firm is a wealth management firm.

\* \* \* \* \*